United States Patent [19]

Kyle et al.

[11] Patent Number: 4,882,364
[45] Date of Patent: Nov. 21, 1989

[54] PROCESS FOR MANUFACTURING CLOSED CELL PHENOLIC FOAMS

[75] Inventors: Teresa M. Kyle, Burlington; Paul J. Meunier; Edwin J. MacPherson, both of Sarnia, all of Canada

[73] Assignee: Fiberglas Canada Inc., Ontario, Canada

[21] Appl. No.: 185,386

[22] Filed: Apr. 25, 1988

Related U.S. Application Data

[63] Continuation-in-part of Ser. No. 90,339, Aug. 28, 1987, abandoned.

[51] Int. Cl.$^4$ ............................................. C08J 9/14
[52] U.S. Cl. .................................. 521/136; 521/131; 521/181; 521/98
[58] Field of Search .................. 521/181, 136, 131, 98

[56] References Cited

U.S. PATENT DOCUMENTS

| | | | |
|---|---|---|---|
| 3,339,361 | 7/1968 | MacPherson et al. | 527/303 |
| 3,640,911 | 2/1972 | Papa et al. | 521/181 |
| 4,216,295 | 8/1980 | Dahms | 521/181 |
| 4,303,758 | 12/1981 | Gusmer | 521/181 |
| 4,345,061 | 8/1982 | Hasselman, Jr. | 528/161 |
| 4,412,014 | 10/1983 | Frentzel et al. | 521/181 |
| 4,478,958 | 10/1984 | Carlson et al. | 521/181 |
| 4,525,492 | 6/1985 | Rastall et al. | 521/181 |
| 4,530,939 | 7/1985 | Rickle | 521/181 |
| 4,546,119 | 10/1985 | Lunt | 521/181 |
| 4,563,499 | 1/1986 | Frentzel et al. | 521/181 |
| 4,575,521 | 3/1986 | Cote et al. | 521/112 |
| 4,576,972 | 3/1986 | Lunt et al. | 521/136 |
| 4,720,510 | 1/1988 | Marks et al. | 521/114 |

FOREIGN PATENT DOCUMENTS

| | | | |
|---|---|---|---|
| 674181 | 11/1963 | Canada | 400/6 |
| 839789 | 4/1970 | Canada | 400/6 |
| 866876 | 3/1971 | Canada | 400/6 |
| 1085999 | 9/1980 | Canada | 403/54 |
| 1113649 | 12/1981 | Canada | 403/54 |
| 1200650 | 2/1986 | Canada | 403/54 |
| 1209747 | 8/1986 | Canada | 403/54 |
| 1209748 | 8/1986 | Canada | 403/54 |
| 1209749 | 8/1986 | Canada | 403/54 |
| 1210898 | 9/1986 | Canada | 403/54 |

OTHER PUBLICATIONS

Skowronski, M. J., Londrigan, M. E., *Organic Surfactants for Rigid Urethane and Isocyanurate Foam*, Journal of Cellular Plastics, vol. 22, May 1986, pp. 235–256.

Technical Data on Pluronic Polyols by the BASF Wyandotte Corporation, Parsippany, N.J. 07054.

Technical Data on Tetronic Polyols Series of Nonionic Surfactants, by the BASF Wyandotte Corporation, Parsippany, N.J. 07054.

*Primary Examiner*—Morton Foelak
*Attorney, Agent, or Firm*—Oliff & Berridge

[57] ABSTRACT

This invention relates to the manufacture of closed cell phenolic foams from low viscosity phenol-formaldehyde resole resin. This method of manufacture provides a foam which exhibits many of the advantageous characteristics of phenolic foams manufactured from high viscosity resole resin, including good thermal retention. There is provided a method of making a phenolic foam comprising the steps of mixing (a) a phenol-formaldehyde resole resin having a water content of approximately 7.5% and a viscosity of approximately 2,800 cps at 40° C.;
(b) a high molecular weight gel forming ethylene oxide-propylene oxide block copolymer surfactant, such as Pluronic F-127 (trade mark);
(c) a catalyst;
(d) a blowing agent;

and curing the resulting foam.

10 Claims, 3 Drawing Sheets

TETRONIC GRID

PROCESS FOR MANUFACTURING CLOSED CELL PHENOLIC FOAMS

FIELD OF THE INVENTION

This is a continuation-in-part of U.S. Application 090,339 filed Aug. 28, 1987, now abandoned.

This invention relates generally to the manufacture of closed cell phenolic foams from phenol-formaldehyde resins and more specifically to the manufacture of closed cell phenolic foams from phenol-formaldehyde resins which have low viscosity.

DESCRIPTION OF THE PRIOR ART

In our previous U.S. Pat. No. 4,576,972, we disclosed a method for manufacturing closed cell phenolic foams. In that patent it was indicated that one of the requirements for producing closed cell foams with high thermal retention was a relatively high initial resole viscosity. A high resole viscosity can be achieved by removing most of the free water in the resole, prior to using it for the manufacture of phenolic foam. Removal of a significant portion of the free water in the resole is also beneficial in helping to produce a finer celled phenolic foam, with a lower friability and a resultant higher compressive strength in the finished product. Lower free water resoles require significantly less acid catalyst to initiate cross-linking reactions and this results in finished foam products which exhibit reduced sensitivity towards moisture absorption.

The manufacture of phenolic foam based products, using the methods disclosed in published European patent applications No. 0,066,960; and No. 0,066,967 and Canadian Pat. No. 1,200,650, all of Fiberglas Canada Inc., generally require the use of resoles with initial viscosities of approximately 50,000 cps at 40° C. and at free water contents of approximately 2.5%.

U.S. Pat. No. 4,303,758 granted to Gusmer teaches the removal of as much free water from the resin as possible. According to Gusmer, column 4, line 19, "Excellent foam is produced when the water content is about 0.1–2% by weight, and even better results are obtained with a water content of about 0.2–1.0% by weight.".

Higher viscosity resoles do however exhibit some undesirable characteristics in that they are extremely reactive and difficult to distribute uniformly when formulated and subsequently processed. Using a lower viscosity resole will overcome these problems and a number of patents have addressed the manufacture of lower viscosity resoles.

U.S. Pat. No. 4,575,521 granted to Cote et al addressed the problem of producing a phenolic foam having a minimum closed cell content of 76%–80% and substantially no perforations or microvoids in the cell walls. Cote et al. teach that control of the water content of the resin and catalyst is of great importance and that the water content should be kept at less than 14% by weight of the total system. The Patent discloses that a solvent should be added to the resin to reduce its viscosity. The process also requires the use of a resin soluble catalyst and that foaming of the product should be conducted in the presence of butyrolactone or another lactone.

U.S. Pat. No. 4,530,939 granted to Rickle also uses a solvent to adjust the viscosity of a resole resin. Rickle prefers a silicone type surfactant.

In view of the production difficulties in mixing and uniformly laying down and distributing foams made from high viscosity resoles it is highly desirable to control the viscosity to 2000 to 12000 cps and preferably to 2200 cps. When the resole viscosity was adjusted by adding water to the resin, using a silicone based surfactant known under the trade mark DC 193, and keeping as many other ingredient and process parameters constant, it was found that the foam could be better mixed and distributed, but that the thermal values drifted upwards to higher values very rapidly, due to the loss of the blowing agent.

In the course of an investigation of alternate surfactants the surprising discovery was made that when the surfactant was a gel forming ethylene oxide-propylene oxide surfactant a closed cell foam of good properties could be produced despite the use of water to lower the viscosity.

In accordance with this invention therefore there is provided a method of making a phenol-formaldehyde foam from a low viscosity resole resin comprising the step of mixing
 (a) a phenol-formaldehyde resole resin having a water content of 4 to 8.0 and in particular 7.2 to 7.8, and a viscosity of 2,000 to 12,000 cps, preferably 2,200 to 3,400 cps at 40° C.;
 (b) a modifying agent such as urea, if desired, in an amount sufficient to react with any free formaldehyde in the resin on an equimolar basis. Part of the urea may be replaced with dicyandiamide;
 (c) a surfactant capable of forming a gel with the foaming composition and preferably a gel forming high molecular weight ethylene oxide-propylene oxide block copolymer surfactant;
 (d) a catalyst, and
 (e) a blowing agent;
and thereafter curing the resulting foam.

Although we do not wish to be limited to a particular scientific theory as to the action of the gel forming high molecular weight ethylene oxide-propylene oxide block copolymer surfactants, we believe that this type of surfactant gels in the presence of the free water present in the resole (about 7.5%) and other water generated during the curing and cross linking reactions. The gelation will cause the viscosity of the foaming material to rise dramatically after mixing, thus reducing or preventing the drainage of polymer from the cell windows. This would then provide reasonably thick cell windows, which are better able to maintain their integrity during and after the cure process. Therefore the process of this invention provides low viscosity when this is desirable for mixing, flow and distribution of the foam, but high viscosity when this is desirable to maintain the integrity of the cell windows.

DESCRIPTION OF THE PREFERRED EMBODIMENTS

The basic steps in preparing foams in accordance with the preferred practice of this invention are as follows:
 (a) Preparation of a low viscosity resole resin;
 (b) Adding a gel forming surfactant;

(c) Adding a catalyst and blowing agent; and
(d) Curing the foam.

The foams are prepared from resoles which have been made using conventional starting mole ratios of phenol to formaldehyde, in the present case in the range of 1:1 to 1:4.5, preferably 1:1.5 to 1:2.5. The high mole ratio materials are the basis for resins which are substantially free of phenol and which can be treated with a formaldehyde co-reactant or scavenger, to reduce the initially high free formaldehyde content.

The basic steps for preparing foams from resole resin are as follows:
(a) preparation of the resole resin;
(b) addition of any modifying agent;
(c) neutralizing the resin;
(d) stripping off water, e.g. by vacuum stripper;
(e) adding the surfactant;
(f) adding a blowing agent;
(g) adding an acid catalyst and allowing the mixture to foam;
(h) curing the foam.

As previously indicated a small amount such as 2–6% by weight of the resole of urea is added. The amount depends on the free formaldehyde. The urea should be sufficient to react with it. It has been found to be beneficial to replace part of the urea with dicyandiamide as an antispalling agent in an amount of about 2–5% by weight of the resole. It is believed that the dicyandiamide causes controlled ruptures of the cell walls at high temperatures to prevent spalling.

The resin is concentrated to reduce the free water content of the resin. A typical high viscosity resin used for manufacturing phenolic foam has a viscosity in the order of 20,000 to 25,000 cps and a free water content of 2.5% at 40° C. However, during the manufacture of phenolic foams from low viscosity resins in accordance with the present invention, the resin utilized will preferably have a viscosity in the order of 2800 cps and a free water content of 7.5% at 40° C.

Figure 1:
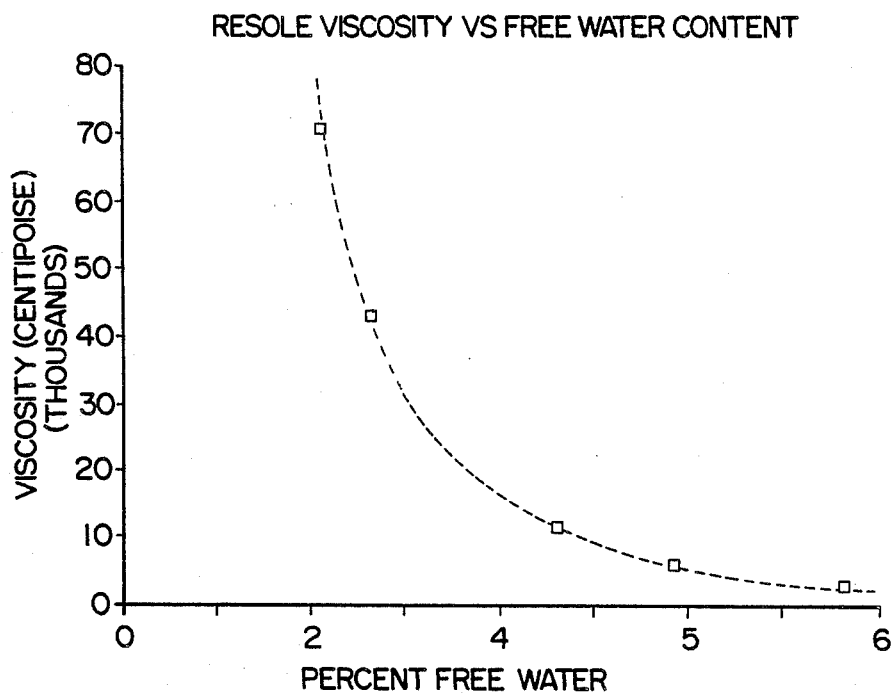
FIG. 1 is a plot of the relationship between viscosity and percent of free water.

FIG. 1 shows the relationship between viscosity and percent of free water, for a typical resole system. As shown in FIG. 1, a high resolve viscosity can be achieved by removing most of the free water in the resole, prior to using it for the manufacture of phenolic foam. Removal of a significant portion of the free water in the resole is also beneficial in helping to produce a finer celled phenolic foam, with a lower friability and a resultant higher compressive strength in the finished product. The lower free water resoles require significantly less acid catalyst to initiate the crosslinking reactions and this results in finished foam products which exhibit reduced sensitivity towards moisture absorption. However, high viscosity resoles are difficult to handle and process when used in the manufacture of phenolic foams, as stated above.

The following examples illustrate the differences in foams produced from resole resins of various viscosities. The examples also describe the manner and process of making the invention, and set forth the best mode contemplated by the inventors by carrying out the invention, but should not be construed as being limiting.

EXAMPLE 1

Preparation of a High Viscosity Resole Resin

A phenol formaldehyde resole resin was prepared by loading a reactor with 5,276 liters of 44% formaldehyde and 4,458 liters of 99% phenol. The agitator was started and the catalyst, 208 lbs of 50% NaOH, was added. At this point, the temperature was about 40° C. This was increased to 50°–55° C. where it was held for twenty minutes. The temperature was raised to 60°–65° C. and held for 20 minutes, then raised to 70°–75° C. where it was held for a further 20 minutes. This time the temperature was increased to 85±1° C. where it was held until the Ostwald viscosity reached 46 cSt at 25° C. The mixture was cooled to 30° C. and neutralized with 50% Ultra TX Acid to a pH of 4.5. The final resin was drained from the reactor and held at 10° C. until concentration. To concentrate the resin, it was allowed to warm to room temperature and then passed through a thin film evaporator, to reduce the free water content to 2.5% or higher, as required. The properties typical of this resin are as follows:
Free Formaldehyde: 2.52%
Free Phenol: 5.04%
Viscosity @ 40° C.: 22,840 cps
Wt Av Mol Wt: 275
No Av Mol Wt: 187
Polydispersivity: 1.47
Z Av Mol Wt: 367
Water Content: 2.58%

EXAMPLE 2 (comparative)

Preparation of a Phenol-Formaldehyde Foam using a High Viscosity Resin

Phenolic foams were prepared by mixing together a resole resin, surfactant, blowing agent and catalyst using a high shear, short residence, rotor/stator continuous mixer. The resole was a high viscosity 1:1.72 P/F resin, such as that illustrated in Example 1.

The blowing agent was a 1,2-dichloro-1,1,2,2-tetrafluorethane available from DuPont as Freon 114, (trade mark).

The surfactant was a silicone based surfactant available as DC-193 from Dow Corning (trade mark).

The foaming catalyst was a 2:1 blend of diethylene glycol and 'Ultra TX Acid' (trade mark), a mixture of toluene and xylene sulfonic acids available from Witco Chemical.

The surfactant was previously added to the resin by feeding it into an in-line mixer as the resin exited the thin-film evaporator. This mixture was heated to 40° C. and the charge line was heat traced to the same temperature. The blowing agent was saturated with air at 140 psi before use.

The resole and surfactant, blowing agent and catalyst were continuously metered to the mixer in the following ratios by means of suitable flow metering devices.
Resin: 96.2 parts
Surfactant: 3.8 parts
Blowing Agent: 13.5–15.3 parts
Catalyst: 3.4 parts The pressure inside the mixer was held at 75–95 psi to avoid premature foaming. The foamable mixture then exited the mixer, passed through a length of tube and was extruded out through a nozzle. Just upstream of this nozzle was a bladder valve to control the back pressure in the mixer and delivery tube and the rate of expansion of the mixture as it left the nozzle.

This nozzle was traversed back and forth at right angles to the machine direction in such a way as to lay down a continuous bead of foam on a moving facer. This resulted in essentially parallel lines of foam which knit together as foaming occurred to form a continuous sheet.

This sheet was then pulled at a fixed rate through a modified Kornylak hot air tunnel held at approximately 60° C. As it came through this oven, it was sufficiently hardened to be cut into convenient pieces and stacked in an oven to complete cure. The boards were held in this final stage for 18 hours at 60° C. and 2 hours at 90° C.

Samples taken from these boards had the following properties.

TABLE 1

| SAMPLE | DENSITY (pcf) | CLOSED CELL* CONTENT | COMPRESSIVE STRENGTH (kPa) at 10% DEFORMATION | INITIAL 'K' $\frac{Btu \cdot in}{ft^2 \cdot h \cdot °F}$ | AGED 'K'** $\frac{Btu \cdot in}{ft^2 \cdot h \cdot °F}$ |
|---|---|---|---|---|---|
| 1 | 2.78 | 96.5% | 278 | 0.109 | 0.127 |
| 2 | 2.55 | 84.1% | 242 | 0.109 | 0.129 |
| 3 | 2.70 | — | | 0.109 | 0.129 |

*All Closed Cell Contents measured by Air Comparison Pycnometer according to ASTM/D-2856 Procedure C.
**Aged for 167 days at 60° C. (1 inch thick core sample with skins removed)

EXAMPLE 3 (comparative)

Phenolic foams were prepared by mixing together a P/F resin, surfactant, blowing agent and catalyst using a high shear short residence mixer.

The P/F resin was 1:1.72 sodium catalysed resin, such as that illustrated in Example 1.

The surfactant was DC-193 silicone surfactant available from Dow Corning.

The blowing agent was Freon 114 (available from DuPont) previously saturated with air at 140 psi.

The catalyst was a mixture consisting of 35% resorcinol, 21% Ultra TX Acid (available from Witco Chemical) and 44% diethylene glycol.

The resin (96.2 parts) and surfactant (3.8 parts) were previously combined via an in-line mixer. These were fed to the mixer in the following ratios:
Resin/Surfactant: 100 parts
Blowing Agent: 14.1–15.4 parts
Catalyst: 3.4 parts Initial cure was effected in a Kornylak hot air tunnel at 60° C. before final cure in an oven at 60° C. for 18 hours and 90° C. for 2 hours.

Foams prepared in this manner had the following properties:

TABLE 2

| SAMPLE | DENSITY (pcf) | CLOSED CELL CONTENT | COMPRESSIVE STRENGTH (kPa) at 10% DEFORMATION | INITIAL 'K' $\frac{Btu \cdot in}{ft^2 \cdot h \cdot °F}$ | AGED 'K'* $\frac{Btu \cdot in}{ft^2 \cdot h \cdot °F}$ |
|---|---|---|---|---|---|
| 1 | 2.56 | — | 297 | 0.110 | 0.130 |
| 2 | 2.83 | — | 296 | 0.110 | 0.134 |
| 3 | 2.69 | 93.6% | 286 | 0.110 | 0.133 |

*Aged for 167 days at 60" C. (1" thick core sample with skins removed)

In this experiment designed to improve on the distribution and lay-down characteristics of these frothed resoles, the resole viscosity was lowered by leaving up to 7.5% free water in the resin. This gave a low initial resole viscosity of the frothed resole, such that acceptable distribution and lay-down characteristics were readily achieved.

A phenolic resole was prepared, as in Example 1. During the concentration stage, less water was removed yielding a resin with similar molecular weights but a water content of 7.5% and viscosity of 2,800 cps at 40° C.

A surfactant, DC-193 (available from Dow Corning) (trade mark) was added, yielding a mixture that was 3.8% by weight surfactant.

The blowing agent was Freon 114 (available from DuPont), saturated with air at 140 psi.

The catalyst was a blend of 15% resorcinol, 57% diethylene glycol and 28% Ultra TX Acid (trade mark) (available from Witco Chemical). These were fed to the mixer in the following proportions:
Resin/Surfactant: 100.0 parts
Blowing Agent: 12.7 parts
Catalyst: 6.8–7.5 parts The foamable mixture passed from the mixer to a stationary multiport distribution device which laid down a number of parallel foam beads which, on expansion, knit together to form a continuous sheet. This sheet then entered a 60° C. modified Kornylak tunnel for initial cure. At the exit, it was cut into boards and placed in an oven for 18 hours at 60° C. and 2 hours at 90° C.

Samples of the cured foam showed the following properties:

TABLE 3

| SAMPLE | DENSITY (pcf) | CLOSED CELL CONTENT | COMPRESSIVE STRENGTH (kPa) at 10% DEFORMATION | INITIAL 'K' $\frac{Btu \cdot in}{ft^2 \cdot h \cdot °F}$ | AGED 'K'* $\frac{Btu \cdot in}{ft^2 \cdot h \cdot °F}$ |
|---|---|---|---|---|---|
| 1 | 2.38 | 79.06% | — | 0.141 | — |
| 2 | 2.41 | 86.58% | — | 0.117 | 0.195 |
| 3 | 2.45 | 77.69% | — | 0.116 | 0.196 |

*Aged for 28 days at 100" C. (1" thick core sample with skins removed)

The resulting product from this lower viscosity resole retained many of the physical characteristics associated with product from the higher viscosity resoles (see Examples 2 and 3). Unfortunately, the initially acceptable thermal performance of the product of Example 4 of less than 0.12K, deteriorated rapidly within a few days to about 0.2K, indicating a rapid loss of the Freon blowing agent. This unexpected loss of thermal properties was discouraging and indicated that the cell morphology of the foaming resole had been signifithey were cut into boards and cured for a further 18 hours at 60° C. and 2 hours at 90° C.

Samples from this trial showed the following properties:

TABLE 4

| SAMPLE | DENSITY (pcf) | CLOSED CELL CONTENT | COMPRESSIVE STRENGTH (kPa) at 10% DEFORMATION | INITIAL 'K' $\frac{\text{Btu} \cdot \text{in}}{\text{ft}^2 \cdot \text{h} \cdot °\text{F.}}$ | AGED 'K'* $\frac{\text{Btu} \cdot \text{in}}{\text{ft}^2 \cdot \text{h} \cdot °\text{F.}}$ |
|---|---|---|---|---|---|
| 1 | 2.59 | 95.6% | — | 0.109 | 0.135 |
| 2 | 2.54 | 96.0% | — | 0.109 | 0.132 |
| 3 | 2.71 | 95.1% | 232 | 0.109 | 0.131 |
| 4 | 2.70 | 96.7% | — | 0.110 | 0.134 |

*Aged for 28 days at 100° C. (1" thick core sample with skins removed)

cantly changed, due to the lower viscosity.

In an attempt to overcome this problem with loss of thermal, further experiments were conducted using a resole with 7.5% free water, but the surfactant was changed from DC-193 (trade mark of Dow Corning Corporation for a polyalkyl siloxane-polyoxyalkylene copolymer) to PLURONIC F-127 (trade mark of BASF Wyandotte for their non-ionic surfactants). The use of this latter surfactant in the manufacture of closed cell foams is taught in our U.S. Pat. No. 4,576,972, which discloses the use of the surfactant in preparation of foams from relatively high viscosity resoles.

EXAMPLE 5

A phenolic resole was prepared according to the procedure in Example 1, except that during the concentration stage, less water was removed. The resin is cooked normally, cooled and neutralized as in Example 1. Neutralization with Ultra-TX (a mixture of toluene and xylene sulphonic acids) yields the soluble sodium salts which do not need filtration.

The resin is then stripped in vacuum to remove water to a predetermined water content, i.e. 7.5%, according to Karl Fischer titration. This sets the viscosity for this particular resin. The resin had a water content of 7.5% and viscosity of 2,800 cps at 40° C. All other characteristics were unchanged.

A surfactant, Pluronic F-127 (an ethylene oxidepropylene oxide block copolymer available from BASF), was melted and added to the resin, yielding a mixture that was 3.5% by weight surfactant. The other streams being fed to the mixer were blowing agent (Freon 114 saturated with air at 140 psi) and catalyst. The catalyst was a blend of 15% resorcinol, 57% diethylene glycol and 28% Ultra TX Acid (available from Witco Chemical). These were introduced to the mixer in the following proportions:
Resin/Surfactant: 100 parts
Blowing Agent: 11.8–12.9 parts
Catalyst: 6.8 parts The mixture was laid onto a moving facer by means of a multiport distribution device and pulled through a hot air tunnel held at 60° C. At the exit of this tunnel

EXAMPLE 6

Phenolic foams were prepared by mixing together a resin/surfactant blend, catalyst and blowing agent.

The resin was a phenolic resole, as described in Example 1, except that the water content was 7.5% and viscosity was 2800 cps.

The surfactant was 3.6 pph resin Pluronic F-127 (an ethylene oxide-propylene oxide block copolymer available from BASF). This solid material was melted before batch mixing with the resin.

The blowing agent was Freon 114 saturated with air at 140 psi.

The catalyst was Ultra TX Acid diluted to 33% with diethylene glycol. These components were fed to the mixer in the following proportions:
Resin/Surfactant: 100 parts
Blowing Agent: 11.9 parts
Catalyst: 9.2 parts The foaming formulation exiting the mixer was laid onto a moving facer by means of a multiport distribution device. Cured foam samples taken from this trial gave the following properties:

TABLE 5

| SAMPLE | DENSITY (pcf) | CLOSED CELL CONTENT | COMPRESSIVE STRENGTH (kPa) at 10% DEFORMATION | INITIAL 'K' $\frac{\text{Btu} \cdot \text{in}}{\text{ft}^2 \cdot \text{h} \cdot °\text{F.}}$ | AGED 'K'* $\frac{\text{Btu} \cdot \text{in}}{\text{ft}^2 \cdot \text{h} \cdot °\text{F.}}$ |
|---|---|---|---|---|---|
| 1 | 2.50 | 96.7% | 247.5 | 0.110 | 0.149 |
| 2 | 2.45 | 94.8% | 239.2 | 0.111 | 0.145 |
| 3 | 2.30 | 94.8% | 248.9 | 0.111 | 0.148 |
| 4 | 2.42 | — | 253.7 | 0.111 | 0.148 |

*Aged for 28 days at 100° C. (1" thick core sample with skins removed)

EXAMPLE 7

Production of a closed cell foam from a low viscosity resin modified with urea

Phenolic foam boards were produced in the following manner.

A resole resin, such as that described in the previous example, was pumped into a 100 gallon reactor and heated to 40° C. To it was added 3.6 pph resin of Pluronic F-127 surfactant (available from BASF) which had been previously melted and 4.1 pph resin of urea prills. This mixture was mixed, under vacuum, until all the urea was dissolved. A catalyst mixture was prepared by blending 49 parts Ultra TX Acid (Witco Chemical), 20 parts diethylene glycol and 31 parts resorcinol. The blowing agent, Freon 114 (DuPont) was saturated with air at 140 psi.

These three components were fed to the mixer in the following proportions:
Resin/Urea/Surfactant: 100 parts were then placed in an oven for 18 hours at 60° C. and 2 hours at 90° C. to complete cure.
The foam properties were as follows:

TABLE 7

| SAMPLE | DENSITY (pcf) | CLOSED CELL CONTENT | COMPRESSIVE STRENGTH (kPa) at 10% DEFORMATION | INITIAL 'K' $\frac{Btu \cdot in}{ft^2 \cdot h \cdot °F}$ | *AGED 'K' $\frac{Btu \cdot in}{ft^2 \cdot h \cdot °F}$ |
|---|---|---|---|---|---|
| 1 | 2.57 | 94.8% |  | 0.121 | 0.158 |
| 2 | 2.62 | 95.3% |  | 0.120 | 0.163 |
| 3 | 2.71 | 95.7% | 208 | 0.122 | 0.156 |

*Aged for 28 days at 100° C. (1" thick core sample with skins removed).

Blowing Agent: 14.3–15.1 parts
Catalyst: 5.9–7.0 parts

The foaming formulation passed from the mixer through a traversing nozzle and was laid onto a moving facer which carried the foam through a modified Kornylak hot air tunnel at 60° C. This foam was set as it left this tunnel. Boards were cut and placed in an oven for 18 hours at 60° C. and 2 hours at 90° C. to complete cure. Samples of the boards showed the following properties:

TABLE 6

| SAMPLE | DENSITY (pcf) | CLOSED CELL CONTENT | COMPRESSIVE STRENGTH (kPa) at 10% DEFORMATION | INITIAL 'K' $\frac{Btu \cdot in}{ft^2 \cdot h \cdot °F}$ | AGED 'K'* $\frac{Btu \cdot in}{ft^2 \cdot h \cdot °F}$ |
|---|---|---|---|---|---|
| 1 | 2.70 | 96.03% | — | 0.113 | 0.128 |
| 2 | 2.82 | 95.71% | — | 0.110 | 0.126 |
| 3 | 2.81 | 95.03% | — | 0.110 | 0.123 |
| 4 | 2.83 | 96.11% | — | 0.110 | 0.123 |

*Aged for 28 days at 100° C.

The thermal testing of this urea modified foam shows superior aging characteristics, as shown in Table 6 of Example 7. It is therefore desirable to use urea and/or dicyandiamide as a modifying agent in an amount sufficient to react with the free formaldehyde.

EXAMPLE 8

Phenolic foams were prepared by combining a resole resin, blowing agent, surfactant and catalyst in the following proportions:
Resin: 96.5 parts
Surfactant: 3.5 parts
Blowing Agent: 11.7–13.3 parts
Catalyst: 10.7 parts The resin was a phenol formaldehyde resole such as that described in Example 1. It was concentrated to yield a resin with similar molecular weights, but a water level of about 7.5% and Brookfield viscosity of about 2800 cps at 40° C. The surfactant, Pluronic F-127 (from BASF) was melted and added to the resin prior to foaming.

The blowing agent was 1,2-dichloro-1,1,2,2tetrafluorethane (available as Freon 114 from DuPont) saturated with air at 140 psi.

The catalyst was a hydrated form of Ultra TX Acid (Witco) dissolved in water and diethylene glycol (29.2% Ultra TX, 12.5% water, 58.3% diethylene glycol).

The components were continuously fed to a mixer and the resultant foaming material laid down onto a moving facer by means of a multiport distribution device. Initial cure took place as the sheet of foam was pulled through a 60° C. hot air tunnel. The rigid boards It was found that the foam manufactured from the relatively low viscosity resole in the manner described in Examples 5, 6, 7 and 8 exhibited exceptionally good thermal properties, as evidenced by aging 1" thick core samples of the foam at 100° C. for 28 days (see Table 4, Example 5).

EXAMPLE 9

In order to define the range of suitable surfactants many surfactants were added to handmixed foam samples. All surfactants were added to the resin at a level of 3.5% of the resin/surfactant blend. Urea was also added to give a final blend that was 92.8 parts concentrated resin (7.1% $H_2O$), 3.4 parts surfactant and 3.8 parts urea. The blowing agent used was Freon 113 (trade mark) (1,1,2 trichloro 1,2,2 trifluoro ethane) at a level of 14 parts pph R/S/U (added to constant weight). The catalyst used was a 50/50 blend of Ultra TX Acid and diethylene glycol at a level of 8 pph R/S/U.

Mixing of the components was done by hand as quickly and thoroughly as possible. The foaming mixture was transferred approximately one minute after catalyst addition to an 8"×8"×2" mold preheated to 60° C. The lid was then clamped in place and a thermocouple was inserted into the middle of the mold through a hole in the lid. This mold was then transferred to a 60° C. convection oven for foaming and curing. The exotherm was monitored until the peak temperature had passed. After approximately one half hour, the foam was removed from the mold. It was left in the 60° C. oven for a further 16–20 hours to complete cure.

The cured samples were trimmed to 8"×8"×1" by removing the surface from both top and bottom. These core samples were then measured for density, initial and aged thermal conductivities, and burning characteristics.

These results have been compiled and presented in Tables 8 and 9.

The surfactants tried cover a very broad range. As well, in groups known to be useful, many were tried in order to more clearly define the range.

Figure 2:
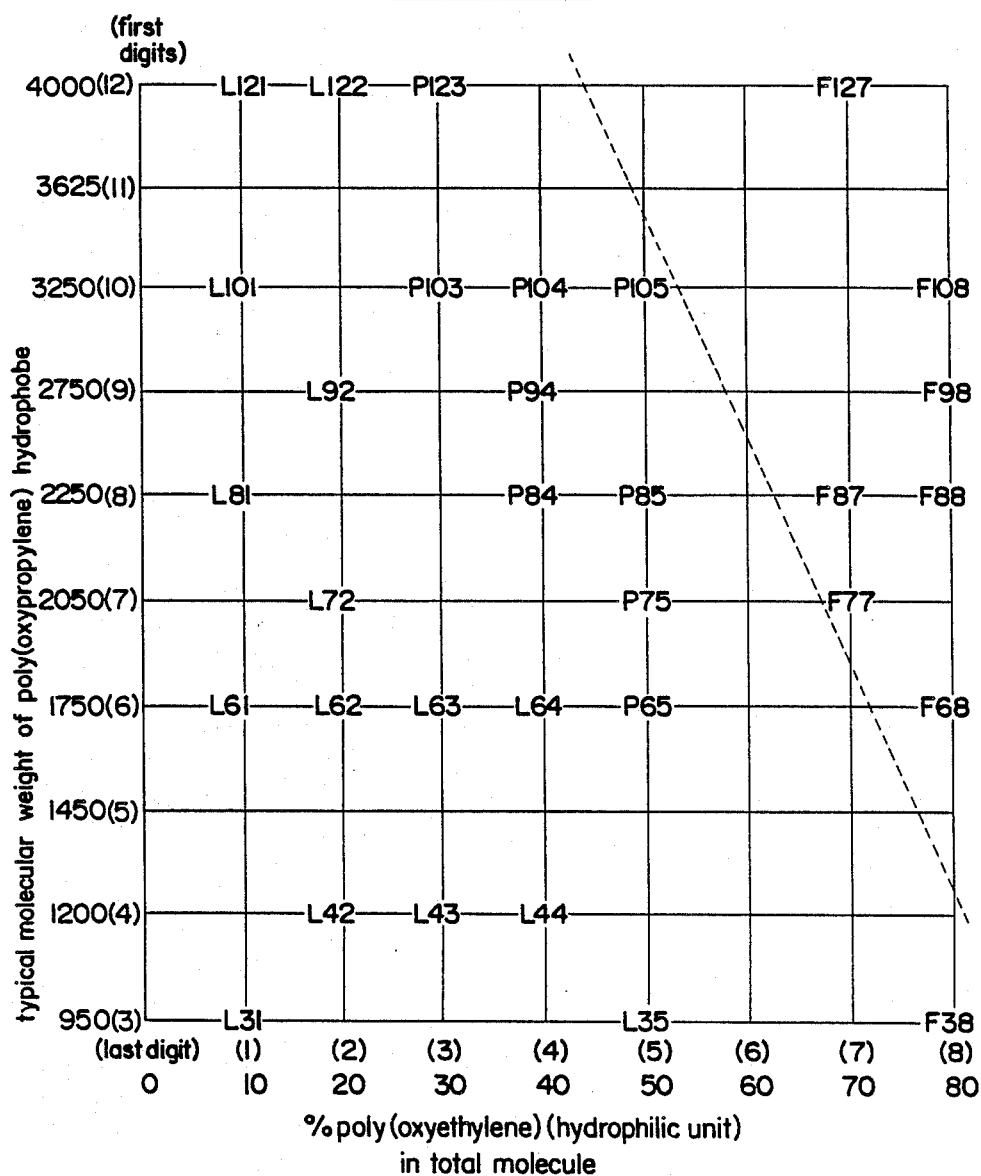
FIG. 2 is a Pluronic (trade mark) grid.

The Pluronic group (trade mark) as expected, provided many materials successfully used as foam stabilizers. All of these are high molecular weight with a high proportion of poly oxyethylene in the molecular structure. FIG. 2 shows the Pluronic grid, with the useful range to the right of the dotted line. All of these can be successfully used to stabilize a closed cell phenolic foam without the need for any further formulation changes.

It should also be noted that all of these surfactants are gel-formers.

Figure 3:
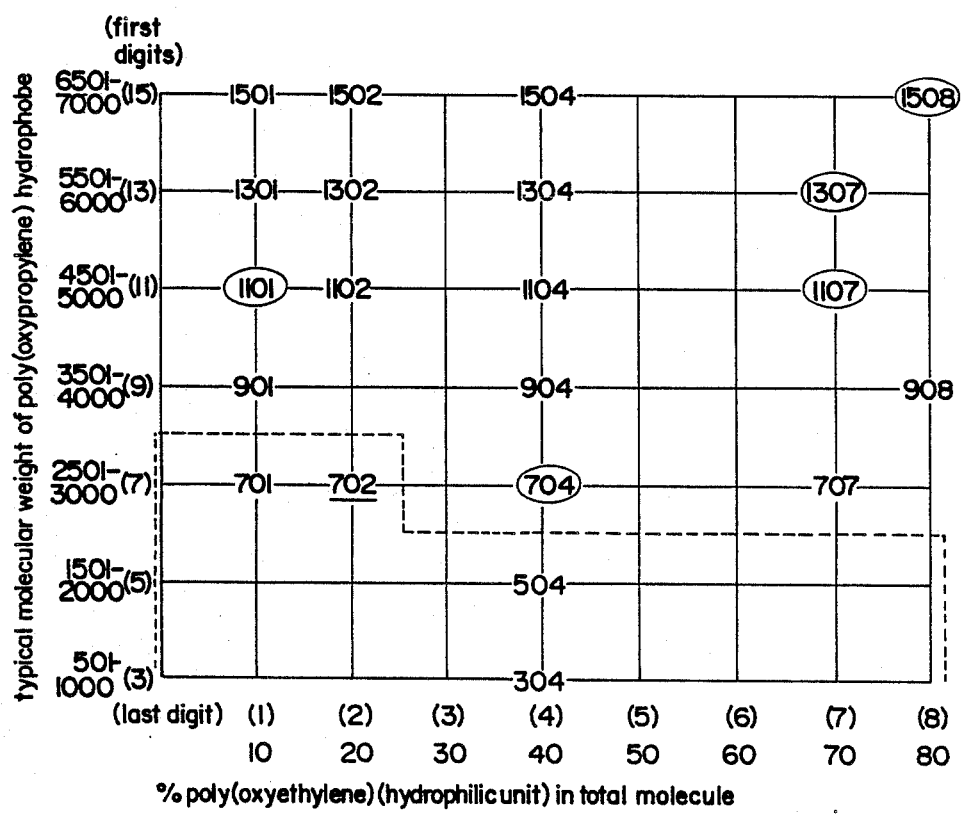
FIG. 3 is a Tetronic (trade mark) grid.

The Tetronics (trade mark) are also ethylene-oxide propylene-oxide block copolymers, but are tetra-functional molecules based on ethylene diamine. As expected, the high molecular weight materials with a high proportion of ethylene oxide worked quite well. Surprisingly, however, Tetronic 1101 also gave quite a good foam. This molecule has a fairly high molecular weight but is only 20% polyoxyethylene, giving it an HLB value of 2 (see FIG. 3—Tetronic Grid). The one thing that this surfactant has in common with the others is its ability to form a gel. The one Tetronic that was not successful (702) does not form a gel at any concentration. This no gel region is defined by the broken line.

Another group of surfactants are the Foamstab (trade mark) which are essentially modified Pluronics. These had been examined microscopically prior to use in a foam. This indicated that the 200 would not support the expanding foam. This results was confirmed in the foam. The 210 did support the foam but failed to achieve closed cells and good thermal values.

Miscellaneous other surfactants were tried but none of these succeeded in producing foam with acceptable thermal values. These can be seen in Tables 2 and 3.

It may be desirable to add agents such as hydroxy cellulous that promote gel formation. As a result of this investigation the best surfactants appear to be the high molecular weight gel forming propylene-oxide copolymers such as the selected Pluronics and Tetronics.

TABLE 8

| SURFACTANT | TYPE | MW | HLB | PEAK TEMP | PEAK TIME | COMMENTS |
|---|---|---|---|---|---|---|
| Pluronic F-127 | Propylene-Oxide | 12500 | 22.0 | 90.2° C. | 6 min 5 | Difficult to mix in |
| Pluronic P-103 | Block Copolymers | 4950 | 9.0 | | | Collapsed |
| Pluronic F-98 | | 13000 | 27.5 | 88.0° C. | 5 min 25 | |
| Pluronic F-88 | | 10800 | 28.0 | 89.0° C. | 5 min 40 | |
| Pluronic F-87 | | 7700 | 24.0 | 86.8° C. | 5 min 45 | |
| Pluronic F-77 | | 6600 | 24.5 | 85.0° C. | 6 min 25 | |
| Pluronic P-85 | | 4600 | 16.0 | 88.4° C. | 5 min 50 | |
| Pluronic L-81 | | 2750 | 2.0 | | | Collapsed |
| Pluronic F-68 | | 8350 | 29.0 | 87.8° C. | 5 min 30 | |
| Tetronic 1508 | Tetrafunctional | 27000 | 27.0 | 85.2° C. | 6 min 15 | |
| Tetronic 1307 | EO-PO Block | 18600 | 23.5 | 83.0° C. | 6 min 45 | |
| Tetronic 1101 | Copolymers Based on | 5600 | 2.0 | 88.4° C. | 6 min | |
| Tetronic 1101 | Ethylene Diamine | 5600 | 2.0 | 88.4° C. | 5 min 50 | |
| Tetronic 704 | | 5500 | 15.0 | 88.8° C. | 6 min 20 | |
| Tetronic 702 | | 4000 | 7.0 | 86.4° C. | 6 min 50 | Extremely Coarse |
| Nikkol PBC-44 | POE, POP Cetyl Ethers | | | 76.0° C. | 7 min 10 | Collapsed |
| Nikkol PBC-34 | | | | 74.6° C. | 6 min 50 | Collapsed |
| BRIJ 58 | POE Alkyl Ethers | | 15.7 | 89.6° C. | 6 min 20 | Collapsed |
| BRIJ 76 | | | 12.4 | 76.6° C. | 7 min 30 | Collapsed |
| BRIJ 78 | | | 15.3 | 89.8° C. | 7 min 30 | Collapsed |
| Gantrez AN-119 | Poly (Methyl Vinyl Ether/ | | | | | Collapsed - Undissolved |
| Gantrez AN-139 | Maleic Anhydride) | | | | | Collapsed - Undissolved |
| Gantrez AN-149 | | | | | | Collapsed - Undissolved |
| Gantrez AN-169 | | | | | | Collapsed - Undissolved |
| Gantrez M-154 | Poly (Methyl Vinyl Ether) | | | 86.4° C. | 5 min 40 | |
| Texaco M-310 | Amine Ethoxylates | | | 90.4° C. | 8 min 40 | Collapsed |
| Texaco M-315 | | | | 89.8° C. | 5 min 30 | |
| Igepal CO 710 | Nonyl Phenoxy POE Ethanol | | 13.6 | 95.4° C. | 5 min 30 | Collapsed |
| Atlas G-1292 | | | | 79.0° C. | 9 min 15 | |
| Foamstab 200 | | | | | | |
| Foamstab 211 | | | | | | Collapsed |

TABLE 9

| Sample Test Dates SURFACTANT | Day 1 K | Day 4 K | Day 5 K | Day 9 K | Day 10 K | Day 17 K | Day 22 K | Day 24 K | Day 31 K | Day 32 K | Day 33 K | Day 37 K | After 3 Days at 60° K | Density pcf CORE | Sample Weight GRAMS | |
|---|---|---|---|---|---|---|---|---|---|---|---|---|---|---|---|---|
| Pluronic F-68 | 0.116 | | 0.117 | 0.122 | | 0.122 | 0.120 | | | 0.123 | | 0.123 | 0.121 | 2.76 | 44.8 | |
| Pluronic F-98 | 0.116 | | 0.123 | 0.122 | | 0.123 | 0.121 | | | 0.125 | | 0.126 | 0.130 | 2.72 | 44.3 | min. spalling |
| Pluronic | 0.169 | | 0.231 | 0.236 | | 0.236 | 0.236 | | | 0.236 | | 0.237 | 0.233 | 2.58 | 41.8 | |
| Pluronic F-77 | | 0.122 | | 0.126 | | 0.129 | 0.128 | | | 0.131 | | 0.132 | 0.138 | 2.86 | 46.4 | min. spalling |
| Pluronic F-88 | | 0.116 | | 0.120 | | 0.121 | 0.120 | | | 0.121 | | 0.123 | 0.124 | 2.79 | 45.2 | |
| Pluronic F-87 | | 0.121 | | 0.123 | | 0.124 | 0.125 | | | 0.129 | | 0.130 | 0.134 | 2.69 | 44.2 | |
| Tetronic 1307 | | 0.134 | | 0.142 | | 0.143 | 0.145 | | 0.152 | | | 0.149 | 0.156 | 2.78 | 45.1 | min. spalling |
| Tetronic 1508 | | | | 0.126 | | 0.130 | 0.128 | | 0.134 | | | 0.133 | 0.137 | 2.87 | 46.7 | |
| Atlas G-1292 | | | | | 0.140 | 0.152 | 0.153 | 0.173 | | | | 0.181 | 0.209 | 2.80 | | |
| Gantrez M-154 | | | | | | | 0.132 | 0.208 | | | | 0.214 | | 2.76 | 43.6 | |

TABLE 9-continued

| Sample Test Dates SURFACTANT | Day 1 K | Day 4 K | Day 5 K | Day 9 K | Day 10 K | Day 17 K | Day 22 K | Day 24 K | Day 31 K | Day 32 K | Day 33 K | Day 37 K | After 3 Days at 60° K | Density pcf CORE | Sample Weight GRAMS | |
|---|---|---|---|---|---|---|---|---|---|---|---|---|---|---|---|---|
| Tetronic 1101 | | | | | | | | 0.127 | 0.141 | | | 0.138 | 0.152 | 3.02 | 42.7 | min. spalling |
| Texaco M-315 | | | | | | | | 0.265 | 0.272 | | | 0.271 | | 3.21 | 43.2 | |
| Tetronic 704 | | | | | | | | | 0.126 | | 0.135 | 0.137 | 0.1147 | 2.74 | 49.9 | min. spalling |
| Tetronic 702 | | | | | | | | | 0.229 | | 0.252 | 0.249 | | 2.75 | 49.9 | |
| Tetronic 1101 | | | | | | | | | 0.121 | | 0.131 | 0.132 | 0.145 | 2.84 | 50.7 | no spalling |
| Pluronic F-127 | | | | | | | | | 0.122 | | 0.128 | 0.131 | 0.137 | 2.77 | 49.9 | |
| Foamstab | Initial | 0.161 | | | | | | | | | | | | 2.78 | | |

What is claimed as the invention is:

1. A process for producing a closed cell phenolic foam comprising the step of mixing to form a foaming composition:
   (a) a phenol formaldehyde resole resin having substantially no free formaldehyde and having a water content of 4 to 8% and a viscosity of approximately 2,000 cps to 12,000 cps at 40° C.;
   (b) a surfactant comprising an ethylene oxide-propylene oxide block copolymer capable of forming a gel with the foaming composition;
   (c) a catalyst; and
   (d) a blowing agent;
and curing the resulting foam.

2. A process as in claim 1 in which the surfactant is a high molecular weight gel forming ethylene oxide-propylene oxide block copolymer.

3. A process of producing a closed cell phenolic foam comprising the step of mixing
   (a) a phenol formaldehyde resole resin having a water content of 7.2 to 7.8% and a viscosity of 2200 to 3400 cps at 40° C.;
   (b) a high molecular weight gel forming ethylene oxide-propylene oxide block copolymer surfactant;
   (c) a catalyst, and
   (c) a blowing agent,
and curing the resulting foam.

4. A process according to claim 1, including the steps of forming a first mixture of the phenolic resole resin and surfactant, and subsequently mixing the first mixture with the blowing agent and catalyst.

5. A process as in claim 1 wherein the first mixture further comprises a substance selected from the group consisting of urea and dicyandiamide.

6. A process as in claim 1 wherein the block copolymer surfactant is an ethylene oxide-propylene oxide block copolymer which is in the range to the right of the dotted line in FIG. 2 hereof.

7. A process as in claim 1 wherein the phenol-formaldehyde resole resin is a base catalysed phenol-formaldehyde resole having a mole ratio of phenol to formaldehyde of between 1:1 and 1:4.6.

8. A process as in claim 6 wherein the mole ratio of phenol to formaldehyde is from 1:1.5 to 1:2.5.

9. A process as in claim 1 in which the resole resin has a water content of approximately 7.5% and a viscosity of approximately 2,800 cps.

10. A process as in claim 5 wherein the urea is 2–6% by weight of the resole and in which part of such urea has been replaced with dicyandiamide in an amount of 2–5% by weight of the resole.

* * * * *